(12) United States Patent
Miro

(10) Patent No.: US 6,566,294 B2
(45) Date of Patent: May 20, 2003

(54) MULTI-DONOR CATALYST SYSTEM FOR THE POLYMERIZATION OF OLEFINS

(75) Inventor: Nemesio D. Miro, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 64 days.

(21) Appl. No.: 09/745,400

(22) Filed: Dec. 21, 2000

(65) Prior Publication Data

US 2002/0119888 A1 Aug. 29, 2002

(51) Int. Cl.$^7$ .......................... B01J 31/00; B01J 37/00; C08F 4/02; C08F 4/60
(52) U.S. Cl. ....................... 502/125; 502/132; 502/133; 502/134
(58) Field of Search ........................................ 502/125

(56) References Cited

U.S. PATENT DOCUMENTS

| | | |
|---|---|---|
| 4,218,339 A | 8/1980 | Zucchini et al. |
| 4,328,122 A | 5/1982 | Monte et al. |
| 4,340,704 A | 7/1982 | Borghi et al. |

(List continued on next page.)

FOREIGN PATENT DOCUMENTS

| | | |
|---|---|---|
| CA | 2103694 | 2/1994 |
| EP | 0 385 765 A2 | 9/1990 |
| EP | 0 490 353 A2 | 6/1992 |
| EP | 0 601 496 A1 | 6/1994 |
| EP | 0 657 477 A2 | 6/1995 |
| EP | 0 676 419 A1 | 10/1995 |
| EP | 0 717 053 A2 | 6/1996 |
| EP | 1 038 888 A2 | 9/2000 |
| GB | 2 035 343 A | 6/1980 |
| WO | WO 95/21203 | 8/1995 |
| WO | WO 96/04320 | 2/1996 |
| WO | WO 97/43321 | 11/1997 |
| WO | WO 98/45338 | 10/1998 |
| WO | WO 00/42081 | 7/2000 |
| WO | WO 00/43123 | 7/2000 |
| WO | WO 00/44793 | 8/2000 |
| WO | WO 00/44795 | 8/2000 |

OTHER PUBLICATIONS

Derwent Abstract for Japanese Patent No. 04 117411A (Apr. 17, 1992).
Derwent Abstract for Japanese Patent No. 04 117412 A (Apr. 17, 1992).
Derwent Abstract for Japanese Patent No. 04 136 006 A (May 11, 1992).
Derwent Abstract for Japanese Patent No. 04 239 008 A (Aug. 26, 1992).
Derwent Abstract for Japanese Patent No. 04 6248019 A (Sep. 6, 1994).
Advanced Inorganic Chemistry, F. Albert Cotton, et al, pp. 1280–1282, 4th ed, 1980.
"Stereoregular Linear Polymers," Concise Encyclopedia of Polymer Science And Engineering, Kroschwitz, et al, pp.1087–1106, 1990.

*Primary Examiner*—Mark L. Bell
*Assistant Examiner*—J. Pasterczyk
(74) *Attorney, Agent, or Firm*—Kevin M. Faulkner; Leandro Arechederra

(57) ABSTRACT

The present invention provides a catalyst system and methods for polymerizing homopolymers or copolymers of olefins, preferably polypropylene and copolymers of polypropylene. The catalyst system includes a Ziegler-Natta or Ziegler-Natta-type catalysts in combination with a mixture of silane electron donors, preferably at least two electron donors, even more preferably three electron donors, selected from tetraethoxysilane, methylcyclohexyldimethoxysilane, propyltrimethoxysilane, propyltriethoxysilane, dimethyldimethoxysilane, methyltrimethoxysilane, dicyclopentyldimethoxysilane and mixtures thereof. The preferred silane electron donor is methylcyclohexyldimethoxysilane.

19 Claims, 5 Drawing Sheets

U.S. PATENT DOCUMENTS

| | | |
|---|---|---|
| 4,350,802 A | 9/1982 | Baba et al. |
| 4,395,360 A | 7/1983 | Albizatti et al. |
| 4,473,660 A | 9/1984 | Albizzati et al. |
| 4,493,923 A | 1/1985 | McCullough, Jr. |
| 4,535,068 A | 8/1985 | Job |
| 4,540,756 A | 9/1985 | Johnson |
| 4,547,552 A | 10/1985 | Toyota et al. |
| 4,562,173 A | 12/1985 | Terano et al. |
| 4,563,512 A | 1/1986 | Goodall |
| 4,565,798 A | 1/1986 | Yamamoto et al. |
| 4,581,426 A | 4/1986 | Asanuma et al. |
| 4,716,206 A | 12/1987 | Fujita et al. |
| 4,736,002 A | 4/1988 | Allen et al. |
| 4,927,797 A | 5/1990 | Ewen |
| 4,990,477 A | 2/1991 | Kioka et al. |
| 4,990,479 A | 2/1991 | Ishimaru et al. |
| 5,023,223 A | 6/1991 | Ebara et al. |
| 5,055,528 A | 10/1991 | Kioka et al. |
| 5,066,738 A | 11/1991 | Ewen |
| 5,093,415 A | 3/1992 | Brady, III et al. |
| 5,100,981 A | 3/1992 | Schreck et al. |
| 5,110,981 A | 5/1992 | Milstein |
| 5,159,021 A | 10/1992 | Kioka et al. |
| 5,218,052 A | 6/1993 | Cohen et al. |
| 5,244,989 A | 9/1993 | Hara et al. |
| 5,338,801 A | 8/1994 | Eppert, Jr. |
| 5,449,738 A | 9/1995 | Koura et al. |
| 5,455,303 A | 10/1995 | Panagopoulos, Jr. et al. |
| 5,552,482 A | 9/1996 | Berta |
| 5,652,303 A | 7/1997 | Ishimaru et al. |
| 5,733,980 A | 3/1998 | Cozewith et al. |
| 5,891,817 A | 4/1999 | Shamshoum et al. |
| 5,932,510 A | 8/1999 | Hosaka et al. |
| 6,034,025 A | 3/2000 | Yang et al. ............ 502/126 |
| 6,066,702 A | 5/2000 | Ro et al. |
| 6,083,866 A | 7/2000 | Costa et al. |
| 6,087,459 A | 7/2000 | Miro et al. |
| 6,111,039 A | 8/2000 | Miro et al. |
| 6,127,303 A | 10/2000 | Ebara et al. |
| 6,133,385 A | 10/2000 | Shamshoum et al. |
| 6,331,501 B1 | 12/2001 | Satoh et al. ............ 502/128 |

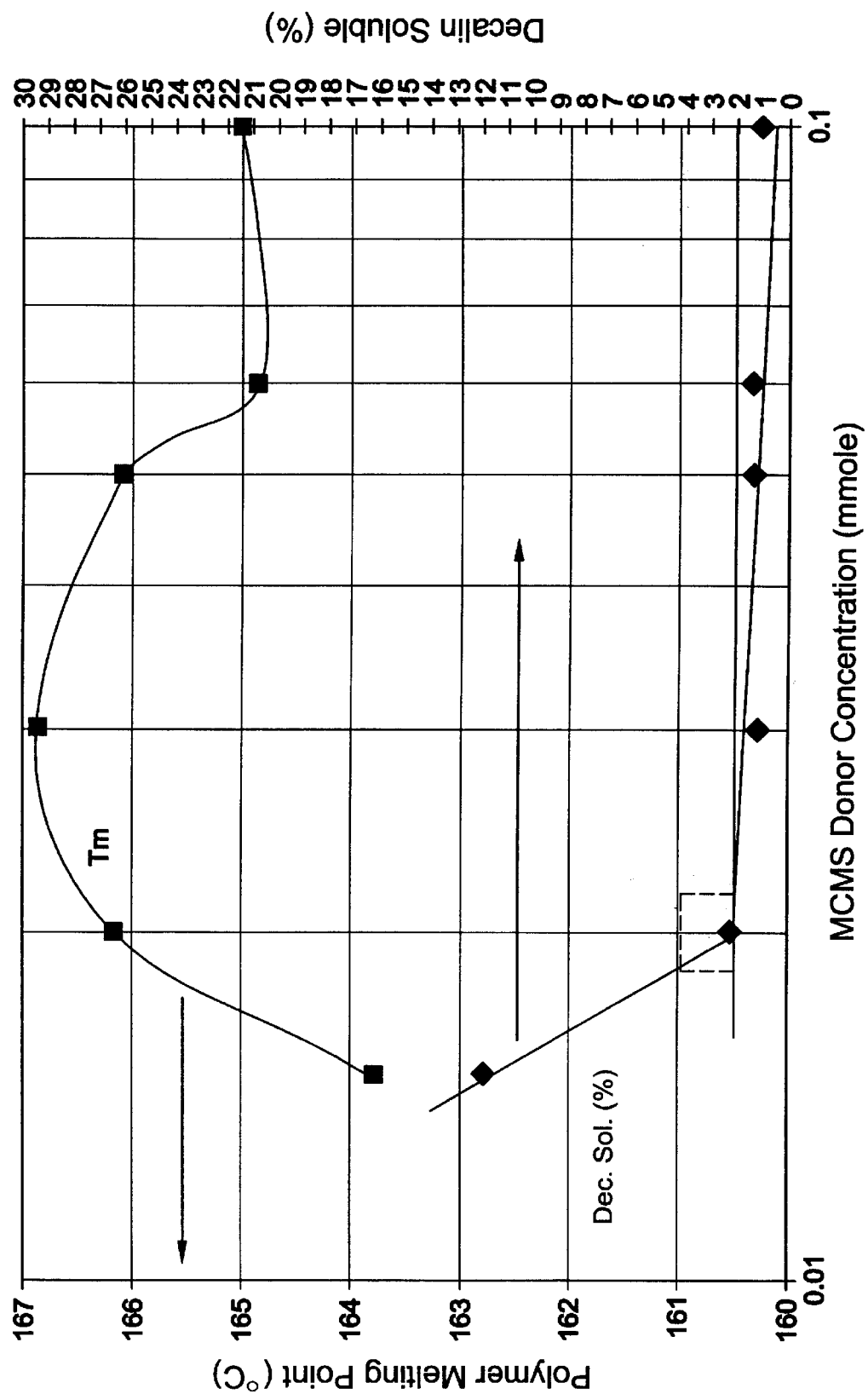
Fig. 1 Use of MCMS as Donor; Donor Concentration Effects on TM and DS

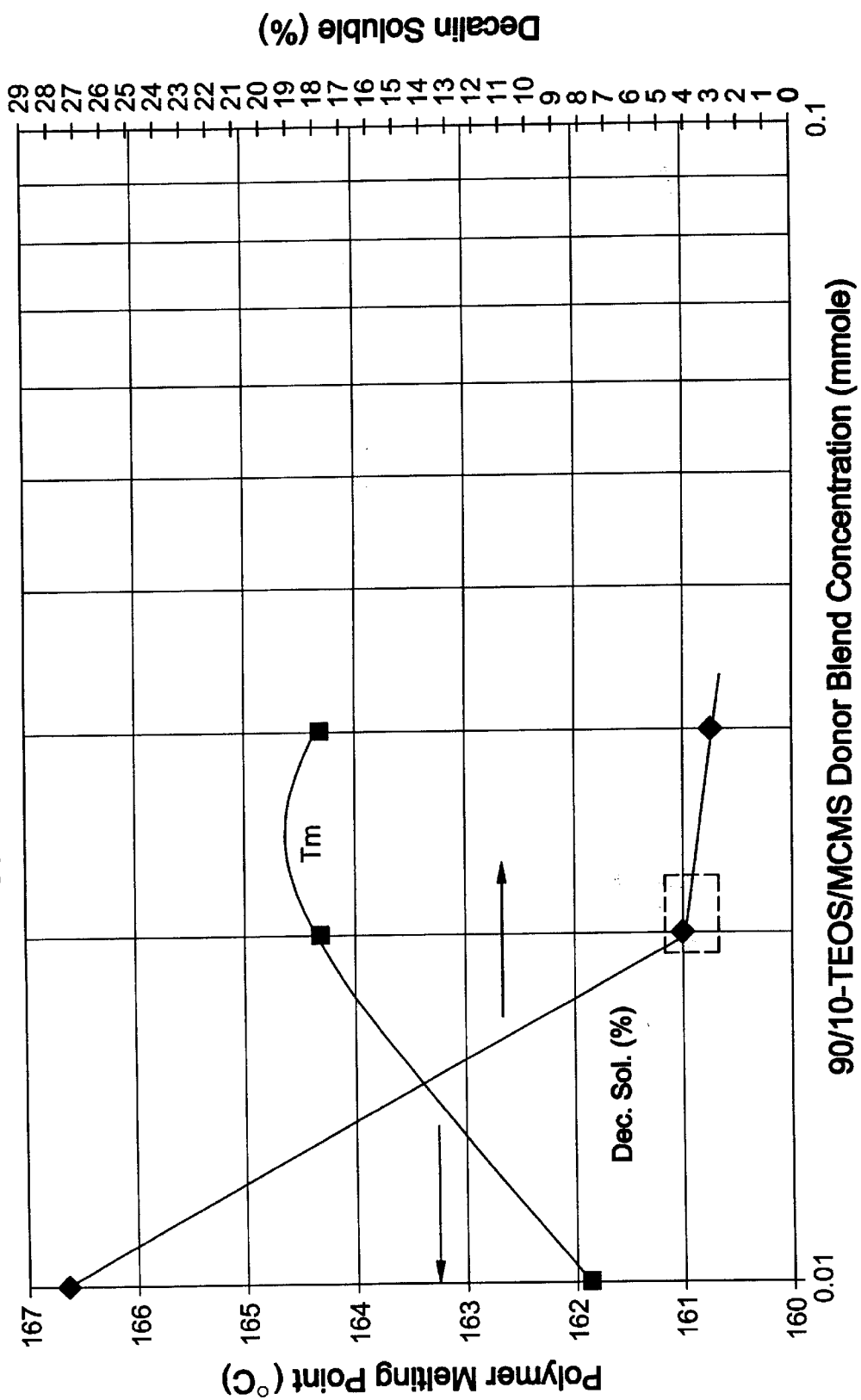
Fig. 2 Use of TEOS/MCMS-90/10 Mole Ratio-Blend as Donor; Donor Concentration Effects on Tm and DS

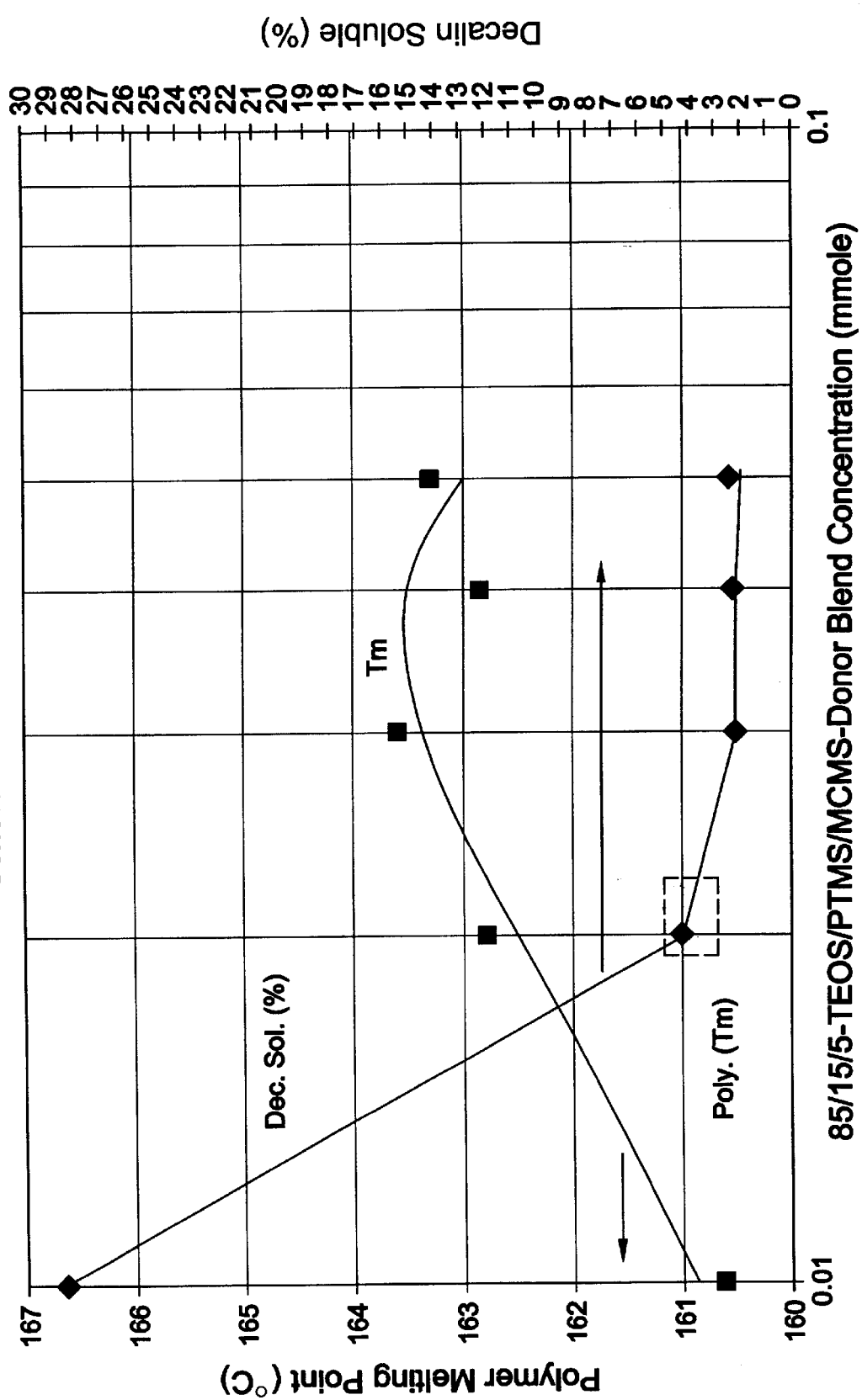
Fig. 3  Use of TEOS/PTMS/MCMS-80/15/5 Mole Ratio-Blend as Donor; Donor Concentration Effects on Tm and DS

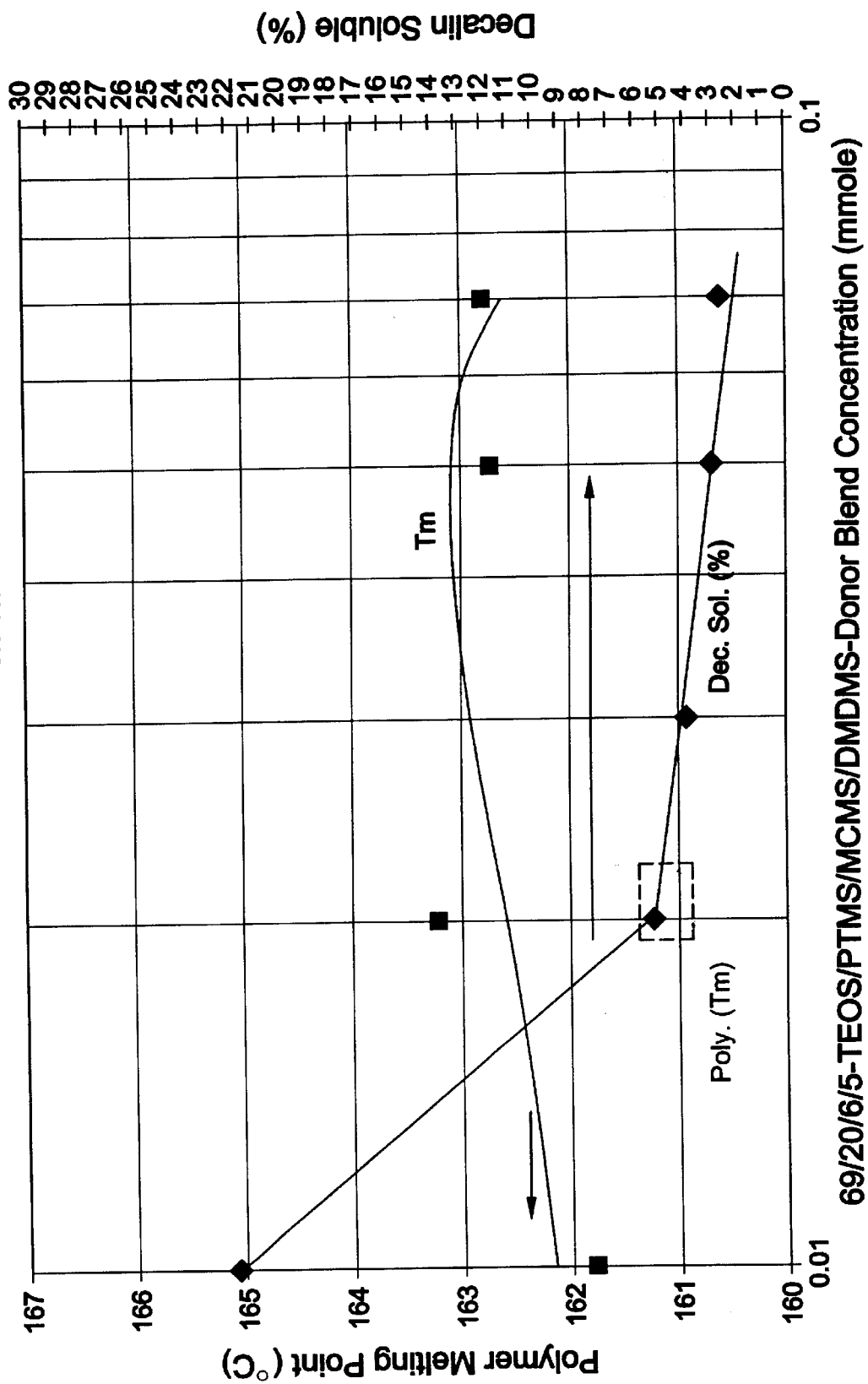
Fig. 4  Use of TEOS/PTMS/MCMS/DMDMS-69/20/6/5 Mole Ratio-Blend as Donor; Donor Concentration Effects on Tm and DS

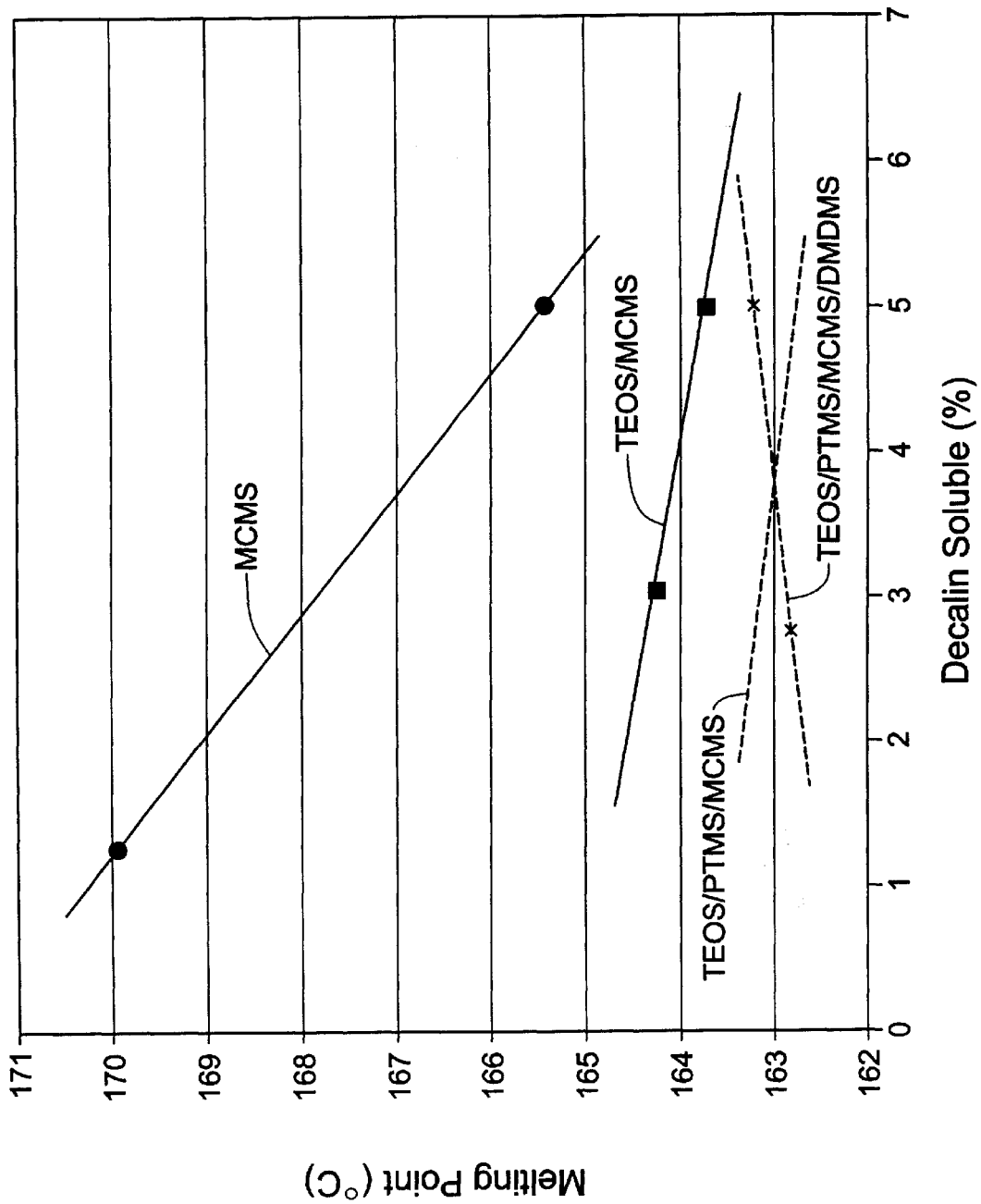
Fig. 5 Decalin-Soluble/Melting-Point Balance

MULTI-DONOR CATALYST SYSTEM FOR THE POLYMERIZATION OF OLEFINS

BACKGROUND

1. Field of the Invention

The present invention relates to catalyst components for olefin polymerization which can produce polyolefins, and in particular polypropylene having a low melting point, high amount of atactic content that is soluble in decalin solvent, and consequently, suitable manufacturing properties.

2. Description of the Prior Art

The homopolymers and copolymers of propylene generally have certain properties that are unsatisfactory for specific applications. It therefore becomes necessary to modify certain characteristics during the manufacture of the polypropylene to render the polymer more useful for a certain end results. For example, if the rigidity of the polymer or copolymer of propylene is improved, it is possible to reduce the thickness of the resulting molded product formed from it.

There are numerous polymerization and copolymerization processes and catalyst systems in the prior art from which it is possible to tailor a processing catalyst system to obtain a specific set of properties of a resulting polymer or copolymer. For example, in certain applications, a product with higher melt flow rate is desirable. Such a product has a lower melt viscosity than a product with a lower melt flow rate. Many polymer or copolymer fabrication processes which operate with high shear rates, such as injection molding, oriented film and thermobinded fibers, would benefit from a lower viscosity product by improving through-put rates and reducing energy costs. Generally, olefin polymers obtained by using an active catalyst component of the magnesium ($MgCl_2$) supported type have a limited melt flow rate range and mechanical properties. As indicated, however, for certain applications, polypropylene polymers which flow readily during melting have improved processing characteristics.

The discovery of more appropriate co-catalysts or electron donors to accompany supported magnesium catalyst components has been of great benefit to improving the efficiency of the catalyst system and the quality control of the polymer product. In such catalyst systems, the cocatalyst activates the catalyst and provides initiation of a polymer chain. The cocatalyst that has historically worked well with magnesium supported catalysts is organoaluminum compounds, most typically triethylaluminum ("TEAL"), or other trialkyl aluminum compounds. Examples of other useful organoaluminum compounds include an alkylaluminum dihalide, a trialkoxyaluminum, a dialkylaluminum halide and a triisobutyl aluminum.

An electron donor compound is used in the polymerization reactor to control the stereoregularity and form of the polymer. Although a broad range of compounds are known generally as electron donors, a particular catalyst may have a specific compound or groups of compounds with which it is especially compatible. Discovery of an appropriate type of electron donor can lead to significant improvements in the properties of the polymer product such as molecular weight distribution and melt flow. Discovery of a specific group of electron donors for magnesium supported catalysts that would provide beneficial results would be highly advantageous.

Electron donors have been used to improve the melt flow rate ("MFR") characteristics of polypropylene polymers by controlling the polymer chain length and position of defects along those chains. However, the drawback to adding an electron donor to the catalyst and polymerization system is that the melting point of the final polymer product often increases with addition of the electron donor. This is a disadvantage in many processing procedures and applications of the polypropylene product. Further, decalin solubles (a measure of the amount of crystallinity) are often depressed upon the addition of an electron donor, which is a disadvantage when a polymer having less crystallinity is desired.

Another disadvantage to the addition of a single, or certain multiples, of electron donors is that the melting point and decalin soluble profiles are increased. The melting point profile for a given electron donor is the profile (or plot) of the melting points of the polymer generated by the catalyst system as a function of the electron donor concentration. Likewise, the decalin solubles profile is a plot of the decalin solubles (amount of solubles) as a function of the electron donor concentration. When an electron donor, or certain combinations of electron donors are added to the catalyst system, the profile is increased such that the addition of a small amount of electron donor has a large effect upon the melting point or decalin soluble content. This is a disadvantage in commercial processes, where the exact amount of added electron donor is often hard to control. An ideal catalyst system would be one where the added amount of electron donor, or electron donor mixture, would have a relatively small effect on the melting point or decalin solubles, A system having a lower melting point and decalin solubles profile is thus ideal.

The present invention is directed towards the surprising finding that the use of at least two different organosilicon compounds as electron donors in combination with a magnesium supported catalyst is capable of generating polypropylene polymers having a moderately broad molecular weight distribution and desirable MFRs, while lowering the overall melting point of the final product. Further, it has been surprisingly found that the melting point profile and decalin solubles profile are advantageously lowered upon the use of at least two different organosilicon compounds.

SUMMARY OF THE INVENTION

Embodiments of the present invention include a catalyst system for the polymerization of olefins comprising:

(a) a solid magnesium supported titanium catalyst component;

(b) an organoaluminum co-catalyst; and (c) a mixture of at least two electron donors, wherein the mixture comprises methylcyclohexyldimethoxy silane and at least one secondary electron donor, or (d) a mixture of at least three electron donors.

The invention also includes a process for producing polyolefins using the catalyst system. The secondary electron donor or the at least three electron donors are selected from the group consisting of tetraethoxysilane, propyltrimethoxysilane, propyltriethoxysilane, dimethyldimethoxysilane, methyltrimethoxysilane, and dicyclopentyldimethoxysilane, and a mixture thereof. In one embodiment of the catalyst, the solid catalyst is a magnesium supported $TiCl_4$ catalyst comprising $TiCl_4$ and the organoaluminum co-catalyst triethylaluminum.

In order to achieve the high decalin solubles and low melting points of olefins polymerized by the method of the invention, the relative mole ratios of the electron donors is adjusted. In one embodiment, propylene monomers are polymerized using the method of the invention, and the resultant polypropylene has a melting point in the range from 160° C. to 164° C. In another embodiment, the decalin solubles value of the resultant polypropylene is 50% to 100% greater than the value when one electron donor is present. Due to the improved characteristics of the polyolefins produced by the method of the invention, improved articles such as films and injection molded articles can be made.

BRIEF DESCRIPTION OF THE DRAWINGS

FIG. 1 is polypropylene polymer melting point and decalin solubles data represented in a series of graphs, wherein MCMS is used as the electron donor;

FIG. 2 is polypropylene polymer melting point and decalin solubles data represented in a series of graphs, wherein TEOS/MCMS in a mole ratio of 90/10 is used as the electron donor;

FIG. 3 is polypropylene polymer melting point and decalin solubles data represented in a series of graphs, wherein TEOS/PTMS/MCMS in a mole ratio of 80/15/5 is used as the electron donor;

FIG. 4 is polypropylene polymer melting point and decalin solubles data represented in a series of graphs, wherein TEOS/PTMS/MCMS/DMDMS is used in a mole ratio of 69/20/6/5 is used as the electron donor; and FIG. 5 is polypropylene polymer melting point and decalin solubles data represented in a series of graphs, wherein the various electron donor combinations are plotted as separate lines, each a plot of melting point as a function of decalin solubles.

DETAILED DESCRIPTION OF INVENTION

The present invention is directed in general to the combination of a mixture of at least two electron donors with a transition metal catalyst component for use in the polymerization of polyolefins. In one embodiment, the catalyst component is a Ziegler-Natta or Ziegler-Natta-type catalyst system. This combination of electron donors and catalyst component comprises a catalyst system that results in better control of crystallinity and polymer melting point than that provided by an electron donor alone. Moreover, the instant catalyst system maintains a high catalyst efficiency relative to other suitable catalyst systems and, further, the catalyst system of the present invention retains most of its high activity over time. These and other beneficial advantages will become more apparent from the following detailed description of the invention and the accompanying examples.

Electron donors are typically used in two ways in the formation of a catalyst system. First, an internal electron donor may be used in the formation reaction of the catalyst as the transition metal halide is reacted with the metal hydride or metal alkyl. Examples of internal electron donors include: amines, amides, ethers, esters, aromatic esters, ketones, nitriles, phosphines, stibines, arsines, phosphoramides, thioethers, thioesters, aldehydes, alcoholates, and salts of organic acids. The second use for an electron donor in a catalyst system is as an external electron donor and stereoregulator in the polymerization reaction. The same compound may be used in both instances, although typically they are different. A common external electron donor is an organic silicon compound, for example, tetraethoxysilane. A description of the two types of electron donors is provided in U.S. Pat. No. 4,535,068, the disclosure of which is hereby incorporated by reference for purposes of U.S. patent practice.

Embodiments of the invention relate particularly to external electron donors, the term "electron donor" as used herein referring to the external donor. The external electron donor acts as a stereoregulator to control the amount of atactic form of polymer produced. It may also increase the production of isotactic polymers. In these functions, the molecular weight distribution (MWD), high crystallinity, and MFR of produced polymer will be affected by the particular donor used. Organic silicon compounds are known in the art for use as electron donors. Examples of electron donors that are organic silicon (or "silane") compounds are disclosed in U.S. Pat. Nos. 4,218,339; 4,395,360; 4,328,122; 4,473,660; 6,133,385; and 6,127,303, incorporated herein by reference for purposes of U.S. Patent practice.

It has been discovered herein that a particular combination of electron donors does significantly enhance the catalytic properties of a specific type of catalyst. The catalyst involved in the present invention is a Ziegler-Natta-type titanium catalyst for the polymerization of olefins. The instant catalyst system comprises a solid titanium catalyst component in combination with at least two electron donors, and has the following features:

(A) a highly active magnesium supported titanium catalyst component consisting essentially of magnesium, titanium, halogen and an internal electron donor, (B) an organoaluminum compound, and (C) at least
  (1) two electron donors, one of which is methylcyclohexyldimethoxy, or,
  (2) three electron donors.

The method of polymerizing or copolymerizing olefins in the presence of these Ziegler-Natta-type catalysts are common in the art, and are discussed by in *Concise Encyclopedia of Polymer Science and Engineering*, 1087–1107 (Jacqueline I. Kroschwitz ed., 1990) and by F. A. Cotton & G. Wilkinson, *Advanced Inorganic Chemistry*, 1280–1282 (4th ed. 1980). Typical solid magnesium supported catalyst systems and preparations thereof are outlined in U.S. Pat. Nos. 4,990,479 and 5,159,021, and WO 00/44795, the disclosures of which are hereby incorporated by reference for purposes of U.S. patent practice.

Briefly, catalyst component (A) can be obtained by (i) suspending the dialkoxy magnesium in an aromatic hydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

Component B of the instant catalyst system is an organoaluminum co-catalyst. The organoaluminum compound should be halogen-free. Suitable halogen-free organoaluminum compounds (component B) are, in particular, branched, unsubstituted alkylaluminum compounds of the formula $AlR_3$, where R denotes an alkyl radical having 1 to 10 carbon atoms, such as for example, trimethylaluminum, triethylaluminum, trusobutylaluminum, and tridiisobutylaluminum. Further suitable compounds are readily available and amply disclosed in the prior art including U.S. Pat. No. 4,990,477, hereby incorporated by reference for purposes of U.S. patent practice.

The above-described magnesium supported catalysts component (A) exhibits comparable efficiency to previously known catalyst systems when the component (A) is paired with an appropriate silane electron donor, such as tetraethoxysilane ("TEOS") or methylcyclohexyldimethoxysilane ("MCMS"), but that control is significantly enhanced when the catalyst is paired with a combination of both these electron donors when used in the single-stage process of the present invention. This improved isotacticity/MFR control results in an enhanced control of the properties of the polymer product such as melting point.

External electron donor materials include but are not limited to organic silicon compounds, e.g. tetraethoxysilane ("TEOS"), methylcyclohexyldimethoxysilane ("MCMS"), propyltrimethoxysilane ("PTMS"), propyltriethoxysilane ("PTES"), methyltrimethoxysilane ("MTMS"), dimethyldimethoxysilane ("DMDMS") and dicyclopentydimethoxysilane ("DCPMS").

In a desired embodiment of the invention, the external electron donors chosen are methylcyclohexyldimethoxysilane and at least one other silane compound. It has been found that when this silane in combination with at least one other silane are used in combination in a magnesium supported catalyst system, the desired level of crystallinity is achieved as well as a lowered melting point for the final polymer product. In one embodiment, propylene monomers are polymerized using an embodiment of the catalyst system, and the melting point of the resultant polypropylene is from 160° C. to 164° C. in one embodiment, and from 162° C. to 164° C. in yet another embodiment. Also, it has been found that the use of methylcyclohexyldimethoxysilane with at least one other silane lowers the melting point and decalin solubles profile of polypropylene generated by a plot of the melting point and decalin solubles as a function of the concentration of silane electron donor used in the polymerization process. These profiles are exemplified in FIGS. 1–4. Further, the mole ratio of the silane electron donors relative to one another also influences the final properties of the polymer.

Examples of olefins that can be used in the polymerization process of the present invention are alpha-olefins having 2 to 20 carbon atoms such as ethylene, propylene, 1-butene, 4-methyl-1-pentene, 1-octene, 1-hexene, 3-methyl-1-pentene, 3-methyl-1-butene, 1-decene, 1-tetradecene, and 1-eicosine. The preferable alpha-olefins are ethylene and propylene.

Experimental

Melting Points. The melting points were measured by means of a DSC (Differential Scanning Calorimetry). A TA-200/DSC-10 instrument purchased from TA Instruments, Inc. was used to measure the thermal properties of the polymers. 8–13 mgs sample of a polymer granule was placed in cell and the cell purged with nitrogen at room temperature for five minutes. The temperature was raised to 230° C. at a heating rate of 50° C. per minute. The temperature was held for ten minutes, followed by cooling to 50° C. at a cooling rate of 10° C. per minute. After reaching 50° C., the sample was again heated to 200° C. at the rate of 10° C. per minute. The melting point of the second heating cycle was measured.

Decalin Solubles. Two grams of polypropylene granules were dissolved in 100 ml decalin containing some BHT by refluxing the decalin solvent for one hour. Then the solution was kept at room temperature for 16–24 hours to allow the crystallizable polymer to precipitate out of solution. The precipitate was filtered out and 20-ml of the filtrate was evaporated to dryness. The amount of soluble polymer contained in the 20-ml filtrate was multiplied by 500 to obtained the percent decalin soluble.

Polymerization Process in a Batch Reactor. A 2 liter polymerization reactor that has been thoroughly cleaned, dried, and purged well with nitrogen was charged, by a syringe the required amount (millimoles) of silane donor (from a 0.1 M solution in hexane). Then 2.0-mmole of TEAL (from a 1.0 M solution hexane) was added, and the reactor entry port valve was closed. A specified amount of hydrogen in mmoles (12.5–41.7 mmoles) was charged from a 300-ml container under high hydrogen pressure. Approximately 750-ml of liquid propylene was introduced into the reactor. Catalyst in the amount of 8–15 mgs catalyst solid was charged into the reactor by pushing through a catalyst feed tube with about 500-ml liquid propylene. The reactor temperature was raised from room temperature to 70° C., and the polymerization reaction was allowed to continue for one hour. After the polymerization period, the excess propylene was vented out of the reactor and the remaining polymer was collected and allowed to dry out inside a hood. Sample of the polymer granules were taken for DSC and decalin solubles tests. The catalyst provided herein is a magnesium supported catalyst sold commercially by Toho Titanium Corporation of Japan and identified as THC-C type catalyst.

The following Examples and Comparative Examples illustrate the present invention and its various advantages in more detail. The results are summarized in Tables 1, 2 and 3, and FIGS. 1–5.

EXAMPLES

Comparative Examples. The use of siloxane donor compounds during propylene polymerization using a supported Ziegler-Natta-type catalyst allows for the control of the polymer properties such as crystallinity and melting point. In general, the polymer crystallinity increases with increasing donor compound. The preferred siloxane donor is MCMS, which a donor of fairly high crystallinity-enhancing property. A donor that has a higher crystallinity-enhancing property than MCMS is DCPMS (dicyclopentyldimethoxysilane). Other donors of lower crystallinity-enhancing property are PTMS, MTMS (methyltrimethoxysilane), TEOS, and DMDMS. A comparison of the effects of these donors on the resulting polypropylene melting point and decalin solubles is shown in Table 1.

The donors described in Table 1 are ranked in crystallinity based on both the melting point and the decalin soluble results. Generally, the decalin soluble test result is a good indication of the polymer crystallinity, provided that a sufficient amount of donor is used during the polymerization. In the comparative examples in Table 1, all experiments were carried out with the use of 0.2 mmoles of donor, 2.0 mmoles of TEAL, and 42 mmoles of hydrogen. Table 2 shows several possible mole percent ranges of some of the electron donors of the invention, with some of the donors having two to three desirable embodiments. Other donors not listed in Table 2 can be in any range from 0 mole % to 99 mole percent, the mole percents being relative to the total amount of donor.

Example 1

It is possible to increase the amount of decalin soluble by lowering the amount of donor used during polymerization. For example, as shown in FIG. 1, data for which is in Table 3, for the MCMS donor, the decalin solubles gradually increase with decreasing amount of donor down to 0.02 mmole. With further lowering of the donor concentration, the decalin soluble rises steeply. The polymer melting point showed some variability, but as shown in the plot in FIG. 1, the melting point decreased sharply with the steep increase in decalin soluble.

In some polypropylene applications such as film, it is desirable to have a polymer that has a relatively lower melting point of between 162–163.5° C., and with a decalin soluble of 4.5%. From the above example in FIG. 1, it is clear that the use of MCMS donor would not be capable of making this product. The steep slope of the decalin soluble vs. MCMS donor concentration profile makes the manufacturing process control difficult, because of the sharp change in the decalin soluble with a slight process-control variation in the amount of the donor concentration.

Example 2

To achieve the desired balance of melting-point and decalin soluble, 10 mole % of MCMS mixed with the TEOS (the number 4 ranked crystallinity as shown in Table 1). The resulting plot of the polymer property with the donor blend concentration is shown in FIG. 2, data for which is in Table 3. As evident in FIG. 2, the melting point of the resultant polypropylene using the donor blend decreased compared to the use of 100% MCMS, while the decalin soluble capability increased. The decalin solubles increased by about 80% in the MCMS/TEOS mixture relative to the MCMS alone.

Example 3

To further improve the melting-point/decalin soluble balance, some PTMS donor was combined with both MCMS and TEOS, at a mole ration of 80/15/5-TEOS/PTMS/MCMS. Hereinafter, a mole ratio may be expressed in terms of the relative mole percentages, the percentages adding to 100 mole %. This donor blend further improved the melting point capability to a desirable range of 163–163.5° C., while achieving a decalin soluble of around 4.0% as shown in FIG. 3, data for which is in Table 3. The decalin solubles are about 100% greater for the TEOS/PTMS/MCMS blend relative to MCMS alone, as well as most of the electron donors in Table 1. As is evident in FIG. 3, the slope, or profile, of the decalin soluble vs. donor concentration is not as steep, and will thus provide an improved manufacturing process control.

Example 4

To further improve the melting point capability as well as the manufacturing process control, DMDMS, which gave the lowest crystallinity in the above ranking was blended with the mixture of TEOS/PTMS/MCMS at a mole ratio of 69/20/6/5 TEOS/PTMS/MCMS/DMDMS. This resulted in much better low-melting-point capability and better process control as shown in FIG. 4, data for which is in Table 3. Again, the melting point and decalin solubles profile is lower, thus providing better control of the system. The decalin solubles are about 100% greater for the blend of this example relative to the individual donors of Table 1 at the same donor concentration.

To assess the melting-point/decalin-soluble capability of each donor system described above, the melting point was plotted against the decalin soluble, which is shown in FIG. 5. Within the variability of the melting point test, the plot in FIG. 5 shows that the blends using TEOS/PTMS/MCMS and TEOS/PTMS/MCMS/DMDMS gave the best balance of low-melting-point/high-decalin-soluble. Thus, these mixtures exhibit the lowest slope in the plot, and hence are preferred examples of how the melting point and decalin solubles profiles can be improved.

The relative mole ratios of the various electron donors added to the polymerization system also influence the final polymer properties. Table 2 shows this relationship, wherein the mole % is based on the total amount of electron donor. A blend of three or more donors of varying crystallinity effects, where the highest crystallinity is less or equal to 10 mole %. The mid-crystallinity donors such as PTMS or TEOS can be in the range of 15–80 mole %, And with the lowest crystallinity such as DMDMS in the 0–12 mole % range.

The MCMS electron donor is added to the catalyst system in a mole % relative to the mixture of electron donors less than 10 mole % in one embodiment, and less than 5% in another embodiment. However, MCMS can be added in quantities greater than 10 mole % if the electron donor that is added has a lower crystallinity ranking than MCMS, or in other words, causes more atactic polymer. An example of such an electron donor is PTMS. The PTMS is added to the catalyst system in a mole % from 15 to 60 mole percent in one embodiment, and from 30 to 50 mole % in another embodiment. The TEOS is added to the catalyst system in a mole % from 30 to 85 mole % in one embodiment, and from 30 to 60 mole % in another embodiment. The DMDMS is added to the catalyst system in a mole % from 3 to 12 mole percent in one embodiment, and from 4 to 8 mole % in another embodiment.

Polymers made from the process described can be used in various manufacturing processes and articles of manufacture. More particularly, polypropylene, or propylene/ethylene elastomers can be made by the process of the invention and used in the manufacture of, for example, films and in injection molded articles.

The embodiments of the present invention, as described above, are not intended to limit the scope of the present invention, as demonstrated by the claims which follow, since one skilled in the art can, with minimal experimentation, extend the scope of the embodiments.

TABLE 1

Comparison of melting point and decalin solubles data for polypropylene polymerized using the individual electron donors.

| Donor | M.P. (° C.) | Decalin solubles (%) | Ranking |
|---|---|---|---|
| DCPMS | 167.3 | 0.18 | #1 Crystallinity |
| MCMS | 164.7 | 0.90 | #2 Crystallinity |
| PTMS | 164.8 | 1.26 | #3 Crystallinity |
| PTES | 164.7 | 1.38 | #4 Crystallinity |
| MTMS | 162.6 | 2.23 | #5 Crystallinity |
| TEOS | 161, 166 | 2.42 | #6 Crystallinity |
| DMDMS | 138, 152, 160.3 | 14.7 | #7 Crystallinity |

TABLE 2

Examples of relative mole percentage ranges of the various electron donors

| Donor | Electron Donor | [Embodiment] Mole % |
|---|---|---|
| #1 Crystallinity | MCMS | [1] <10 |
|  |  | [2] 10–30 |
| #2 Crystallinity | PTMS | [1] 15–85 |
|  |  | [2] 30–85 |
|  |  | [3] 30–65 |
| #3 Crystallinity | TEOS | [1] 15–90 |
|  |  | [2] 15–60 |
|  |  | [3] 30–60 |
| #4 Crystallinity | DMDMS | [1] 3–12 |
|  |  | [2] 12–30 |

TABLE 3

Examples of the effects of donors on polypropylene polymerization.

| mmole donor mixture | Decalin Solubles (%) | Tm (° C.) [Cat Eff][1] |
|---|---|---|
| MCMS as Donor in Example 1 | | |
| 0.2 | 1.11 | —[40.2] |
| 0.1 | 1.23 | 165 [46.7] |
| 0.06 | 1.52 | 164.9 [45.6] |
| 0.05 | 1.44 | 166.1 [45.6] |
| 0.03 | 1.29 | 166.9 [51] |
| 0.02 | 2.22 | 166.2 [37.6] |
| 0.015 | 12.1 | 163.8 [32.21 |
| TEOS/MCMS Donor Mixture in Example 2 | | |
| 0.03 | 3.25 | 164.3 [34.6] |
| 0.02 | 4.04 | 164.3 [33.6] |
| 0.01 | 27.3 | 161.9 [25.8] |
| TEOS/PTMS/MCMS Donor Mixture in Example 3 | | |
| 0.05 | 2.7 | 163.3 [25.1] |
| 0.04 | 2.46 | 162.9 [23.8] |
| 0.03 | 2.33 | 163.6 [28.8] |
| 0.02 | 4.18 | 162.8 [32.9] |
| 0.01 | 28.8 | 160.7 [25.9] |
| TEOS/PTMS/MCMS/DMDMS Donor Mixture in Example 4 | | |
| 0.07 | 2.39 | 162.8 [25.1] |
| 0.05 | 2.75 | 162.7 [24.6] |
| 0.03 | 3.84 | —[17.3] |
| 0.02 | 5.06 | 163.2 [24.8] |
| 0.01 | 21.7 | 161.8 [22.2] |

[1]The catalyst efficiency, in Kg polymer/g catalyst · hr

I claim:

1. A catalyst system for the polymerization of olefins comprising:
   (a) a solid magnesium supported titanium catalyst component;
   (b) an organoaluminum co-catalyst; and
   (c) a mixture of at least three electron donors; wherein the electron donors are selected from the group consisting of tetraethoxysilane, methylcyclohexyldimethoxysilane, propyltrimethoxysilane, propyltriethoxysilane, dimethyldimethoxysilane, methyltrimethoxysilane, dicyclopentyldimethoxysilane and mixtures thereof; and wherein high crystallinity donors are selected from the group consisting of dicyclopentyldimethoxysilane and methylcyclohexyldimethoxysilane are present from less than or equal to 10 mole % relative to the total amount of donor; and mid-crystallinity donors are selected from the group consisting of propyltrimethoxysilane, propyltriethoxysilane, tetraethoxysilane and methyltrimethoxysilane are present from 18 to 80 mole % relative to the total amount of donor.

2. The catalyst system of claim 1, wherein the solid magnesium supported titanium catalyst is a magnesium supported TiCl$_4$ catalyst comprising TiCl$_4$ and the organoaluminum co-catalyst is triethylaluminum.

3. The catalyst system of claim 1, wherein the mixture of at least three electron donors comprises methylcyclohexyldimethoxysilane, propyltrimethoxysilane, and tetraethoxysilane.

4. The catalyst system of claim 3, wherein the mole percent relative to the total amount of donor of methylcyclohexyldimethoxysilane is from 1 to 10 mole percent, of tetraethoxysilane is from 15 to 60 mole percent, and of propyltrimethoxysilane is from 30 to 85 mole percent.

5. A catalyst system for the polymerization of olefins comprising:
   (a) a solid magnesium supported titanium catalyst component;
   (b) an organoaluminum co-catalyst; and
   (c) a mixture of at least three separate siloxane electron donors; wherein the mixture comprises methylcyclohexyldimethoxysilane, tetraethoxysilane and a third siloxane electron donor.

6. The catalyst system of claim 5, wherein the third siloxane electron donor is selected from the group consisting of propyltrimethoxysilane, propyltriethoxysilane, dimethyldimethoxysilane, methyltrimethoxysilane, dicyclopentyldimethoxysilane, and mixtures thereof.

7. The catalyst system of claim 5, wherein the third siloxane electron donor is propyltrimethoxysilane.

8. The catalyst system of claim 7, wherein the mole percent relative to the total amount of donor of methylcyclohexyldimethoxysilane is from 1 to 10 mole percent, of tetraethoxysilane is from 15 to 60 mole percent, and of propyltrimethoxysilane is from 30 to 85 mole percent.

9. The catalyst system of claim 5, wherein the third siloxane electron donor is dimethyldimethoxysilane.

10. The catalyst system of claim 9, wherein the mole percent relative to the total amount of donor of methylcyclohexyldimethoxysilane is from 1 to 10 mole percent, of tetraethoxysilane is from 15 to 60 mole percent, of propyltrimethoxysilane is from 85 to 30 mole percent, and of dimethyldimethoxysilane from 3 to 12 mole percent.

11. The catalyst system of claim 5, wherein the catalyst is a magnesium supported TiCl$_4$ catalyst comprising TiCl$_4$ and the organoaluminum co-catalyst is triethylaluminum.

12. The catalyst system of claim 5, wherein the co-catalyst is selected from the group consisting of an alkylaluminum dihalide, a trialkyoxyaluminum, a dialkylaluminum halide and triisobutyl aluminum.

13. A catalyst system for the polymerization of olefins comprising:
   (a) a solid magnesium titanium catalyst component;
   (b) a triethylaluminum co-catalyst; and
   (c) a mixture of at least three separate siloxane electron donors, wherein the mixture comprises methylcyclohexyldimethoxy silane, tetraethoxy silane and at least one other siloxane electron donor.

14. The catalyst system of claim 13, wherein the other siloxane electron donor is selected from the group consisting of propyltrimethoxysilane, propyltriethoxysilane, dimethyldimethoxysilane, methyltrimethoxysilane, dicyclopentyldimethoxysilane, and mixtures thereof.

15. The catalyst system of claim 13, wherein the other siloxane electron donor is propyltrimethoxysilane.

16. The catalyst system of claim 15, wherein the mole percent relative to the total amount of donor of methylcyclohexyldimethoxysilane is from 1 to 10 mole percent, of tetraethoxysilane is from 15 to 60 mole percent, and of propyltrimethoxysilane is from 30 to 85 mole percent.

17. The catalyst system of claim 13, wherein the other siloxane electron donors comprise propyltrimethoxysilane and dimethyldimethoxysilane.

18. The catalyst system of claim 17, wherein the mole percent relative to the total amount of donor of methylcyclohexyldimethoxysilane is from 1 to 10 mole percent, of tetraethoxysilane is from 15 to 60 mole percent, of propyltrimethoxysilane is from 85 to 30 mole percent, and of dimethyldimethoxysilane from 3 to 12 mole percent.

19. The catalyst system of claim 13, wherein the catalyst is a magnesium supported TiCl$_4$ catalyst comprising TiCl$_4$.

* * * * *